United States Patent [19]
Seifert

[11] Patent Number: 5,189,775
[45] Date of Patent: Mar. 2, 1993

[54] ZONE CONTROLLED DEFLECTION COMPENSATED ROLL

[75] Inventor: Peter Seifert, Middletown, Ohio

[73] Assignee: The Black Clawson Company, Middletown, Ohio

[21] Appl. No.: 840,460

[22] Filed: Feb. 25, 1992

[51] Int. Cl.$^5$ .................... B21B 31/32; B60B 9/22
[52] U.S. Cl. ............................................. 492/5; 492/7
[58] Field of Search ............... 29/113.1, 113.2, 116.1, 29/116.2

[56] References Cited

U.S. PATENT DOCUMENTS

| | | | |
|---|---|---|---|
| 2,215,069 | 9/1960 | Meisel | 29/113.1 X |
| 3,389,450 | 6/1968 | Robertson | 29/116.2 |
| 3,543,366 | 12/1970 | Collet | 29/113.1 |
| 3,779,154 | 12/1973 | Arendt | 29/113.1 X |
| 3,846,883 | 11/1974 | Biondetti | 29/116 |
| 4,007,522 | 2/1977 | Hold et al. | 29/116 |
| 4,214,354 | 7/1980 | Lehmann | 29/116.2 |
| 4,328,744 | 5/1982 | Pav et al. | 100/162 |
| 4,373,238 | 2/1983 | Güttinger | 29/113.2 X |
| 4,394,793 | 7/1983 | Pav et al. | 29/116 |
| 4,472,865 | 9/1984 | Schiel et al. | 29/116 |
| 4,856,156 | 8/1989 | Link et al. | 29/116.2 X |
| 4,913,051 | 8/1990 | Molinatto | 29/113.2 X |

OTHER PUBLICATIONS

Beloit Self-Loading Controlled Crown Roll, Beloit Corporation B-302 (Apr. 1989).

*Primary Examiner*—Timothy V. Eley
*Assistant Examiner*—C. Richard Martin
*Attorney, Agent, or Firm*—Biebel & French

[57] ABSTRACT

A deflection controlled roll has a rotatable shell supported on a non-rotating central beam by a plurality of individual shoes which are positioned transversely of the beam between the beam and the shell. A curved semicylindrical surface of the shoe bears against an inside surface of the shell and is hydrodynamically lubricated by an oil film, in the nature of a plain bearing. The shoes are biased by inflatable air lift bellows which are positioned within recesses within the shoe, between the shoe and the beam. The shoes are mounted on the beam on pins which provide at least three degrees of freedom of movement. An improved drive for the roll shell has a cog belt sheave mounted on the shell in concentric relation to one of the shell support bearings. A cog-type drive belt is threaded on the sheave, and a drive pulley for the drive belt is positioned normal to the direction of shell deflection such that the deflections do not change the spacing between the pulley and the sheave.

16 Claims, 7 Drawing Sheets

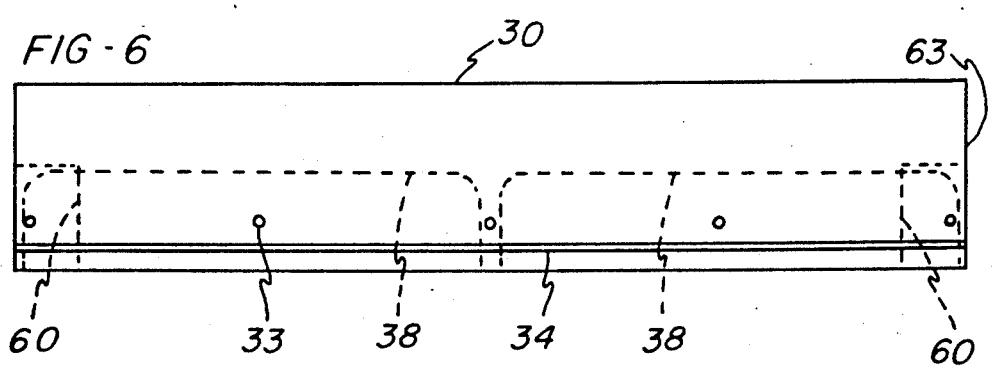
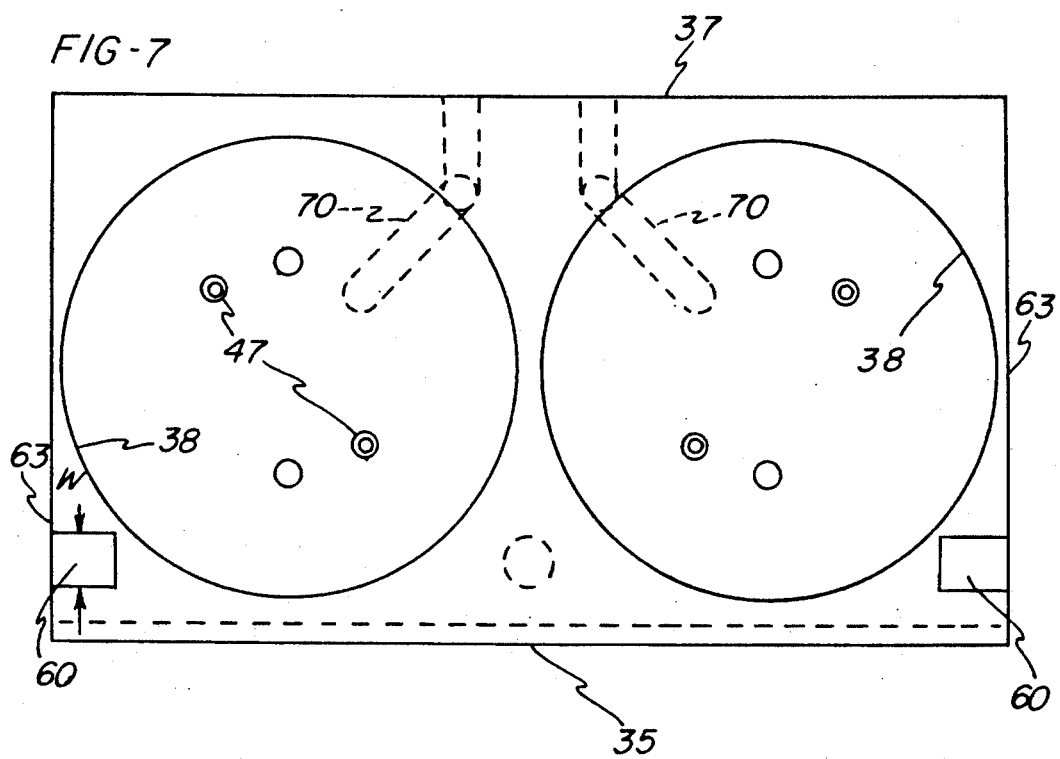
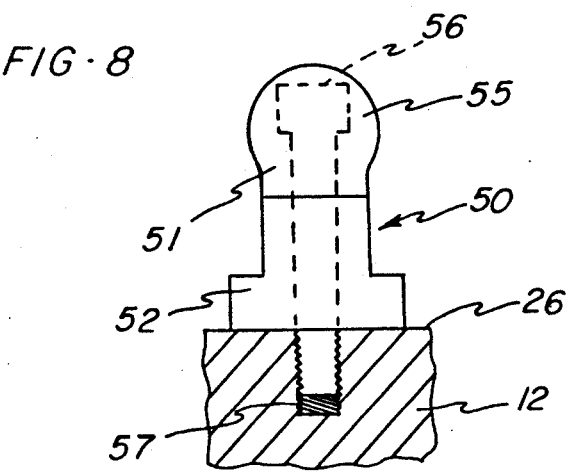

ZONE CONTROLLED DEFLECTION COMPENSATED ROLL

BACKGROUND OF THE INVENTION

The prior patent art contains a large number of zone controlled deflection compensated rolls of the type in which an outer sleeve rotates about, and is supported on a stationary or non-rotating central support beam. A plurality of hydrostatic support elements are positioned along the beam and move or apply a force against an inside surface of the sleeve. While these prior roll concepts are adequate to control the deflection of the sleeve so as to provide a straight line nip or assure a uniform pressure along the nip, as desired, they are generally complex mechanisms and are costly to make and to maintain.

It has also been recognized that for optimum control of the force exerted against the inside of the sleeve, the force applying member or shoe must have certain freedoms of movement, and must provide a contacting surface which is capable of applying or transmitting substantial forces to the shell over long periods of time. Hydrostatic force members which have been designed to meet these requirements have been characterized by complexity of the hydrostatic pressure members and of the supporting structure.

A need exists for an effective, simplified and lower priced controlled deflection roll which has components which are not critical to make and which are easy to maintain, and which operate on the principles of hydrodynamics.

In addition to the complications in the hydrostatic control and structure of the roll, the roll drive mechanisms themselves have been complicated by reason of having to absorb or allow for sleeve angular deflections. This has given rise to a need for a more effective, efficient, and simplified roll drive for compensated deflection roll systems.

SUMMARY OF THE INVENTION

The invention is directed to zone controlled deflection compensated rolls and a drive therefore of substantially simplified design. In the construction of the rolls of this invention, an outer sleeve is rotatably supported on a central axial beam by a plurality of transversely-positioned shoes. The shell is guided by suitable guide bearings which permit movement of the shell toward and away from the mating roll or surface, while the beam may remain stationary. The shoes are actuated by inflatable bellows or actuators. In a preferred design, two bellows-type air actuators are employed for each shoe and are positioned between a support beam and an inside surface of the associated shoe. The shoe, on the other hand, is coupled to the beam so as to provide for several degrees of freedom of movement with respect to the beam.

Each of the shoes is provided with a cylindrically curved outer surface which conforms generally to the adjacent inside surface of the sleeve. A hydrodynamic film of oil is formed between the outer surface of the shoe and the inside surface of the sleeve so that, during operation, there is no surface to surface contact, and the sleeve, along its length, is supported on a film of oil.

In one design version, the mating surfaces forming the bearing surface between the shoe and the sleeve are so configured that a higher unit pressure is applied at the trailing edge than the at the leading edge, thereby to form wedge-shaped gap between the shoe and the sleeve and to assure the infeed of an oil film therebetween.

In a preferred form of the invention, round or circular inflated bellows serve as shoe loading elements. The bellows are located between the shoe and an adjacent support surface of the central beam. The employment of air bellows is of particular advantage due to the ability of the bellows to tilt and conform with the deflection of the roll, and also due to the relatively large available stroke of the bellows without encountering creases or wrinkles within the flexible walls. In addition, the bellows offer an ideal solution to the sealing problem between the relatively movable elements, and can be operated, as desired, on either pressurized liquid gas or air, or a combination of gas and liquid. Since air under pressure is the preferable energy source, the bellows also provide for absorption of shock loads which could otherwise damage the roll or the supporting shoes.

A simplified mounting arrangement is provided between the shoes and the supporting beam. This may advantageously comprise one or more support pins mounted on the beam and received within holes or slots formed in the shoes, generally along or adjacent the leading edge of the shoes. One such mounting arrangement permits the shoe to move radially inwardly and outwardly of the beam ("Z" axis) and simultaneously permits the shoe to tilt or rotate above the mutually perpendicular "X" and "Y" axis, thereby providing three degrees of freedom of movement. In another embodiment a shoe mounting and support arrangement provides a fourth degree of freedom by rotational movement about the "Z" axis.

In all cases the self-aligning movement of the outer cylindrical surface of the shoe permits it to conform fully with the inside surface of the sleeve, under all conditions of operation, and assures a uniform hydrostatic condition between the shoe and the sleeve. The self-aligning action is vital because the relative distance between beam and shell change as the shelf moves toward the nip and as nip load is applied. Also, the hydrodynamic lubrication wedge can now establish itself based on load rather than based on external geometric constraints.

An orthogonal extremely simplified timing belt or cog-type drive is provided for the sleeve. A drive pulley is mounted on the sleeve and centered over a sleeve guide bearing. The drive pulley for the timing belt is positioned at right angles or normal to the direction of stroke of the air lift bellows. In that manner, the relationship of the timing belt to the pulley is not effected by roll deflection. In other words, the sleeve of the roll can move from an unloaded to a fully loaded position without making any substantial change in the theoretical belt length or belt tension. Also, the tension in the timing belt drive does not impact upon roll deflection.

In an alternate version the inflatable bellows are positioned so that neighboring shoes share a bellows. In yet another version, neighboring shoes may be joined or connected at the surface by filling the gaps between them with a flexible material to provide an uninterrupted film of lubricant and sleeve support relative to the axial extension of the roll, in Y direction. This version does not permit rotatability of the shoes around the Z axis.

It is therefore an important object of the invention to provide a zone controlled press roll in which transversely positioned individual pressure shoes are loaded by inflatable bellows.

Another important object of the invention is the provision of a loading shoe arrangement, in a zone controlled deflection roll, in which the individual shoes are provided with at least three degrees of freedom of movement, and in which the shoes are loaded by a self-aligning loading device in the form of bellows-type air actuators.

A further important object and advantage of the invention is that zone controlled loading, in a press roll, is accomplished by a greatly simplified zone loading arrangement, and one in which a hydrodynamic oil film is formed between loading shoes and corresponding loaded surfaces of a sleeve, and in which the loading shoe is free to float or move into a condition in which the pressure or force across the face thereof is substantially uniformly distributed, or may be adjusted to a desired load profile.

A still further object of the invention is the provision of a zone controlled deflection roll, such as for a press, which employs sealed inflatable bellows as load transmitting devices.

Another object of the invention is to provide virtually uninterrupted or continuous support of the shell, in axial relationship, by minimizing the gaps of support between adjacent support elements.

Another important object of the invention is the provision of a self-compensating and self-aligning belt-type drive for a press roll or the like employing a timing belt a cog type belt which does not adversely impact or effect the roll loading, which itself is not adversely affected by roll deflection, and which may be compactly positioned within the side frame of the press. Such device is mechanically simple and inexpensive, in stark contrast to the state-of-the-art gear drives.

These and other objects and advantages of the invention will be apparent from the following description, the accompanying drawings and the appended claims.

BRIEF DESCRIPTION OF THE ACCOMPANYING DRAWINGS

FIG. 6 is a front elevation of the shoe of FIG. 5;

FIG. 7 is a bottom view of the shoe of FIG. 5;

FIG. 8 is a side elevation of one of the shoe support studs used with the shoe of FIGS. 5-7;

DESCRIPTION OF PREFERRED EMBODIMENTS

Figure 1:
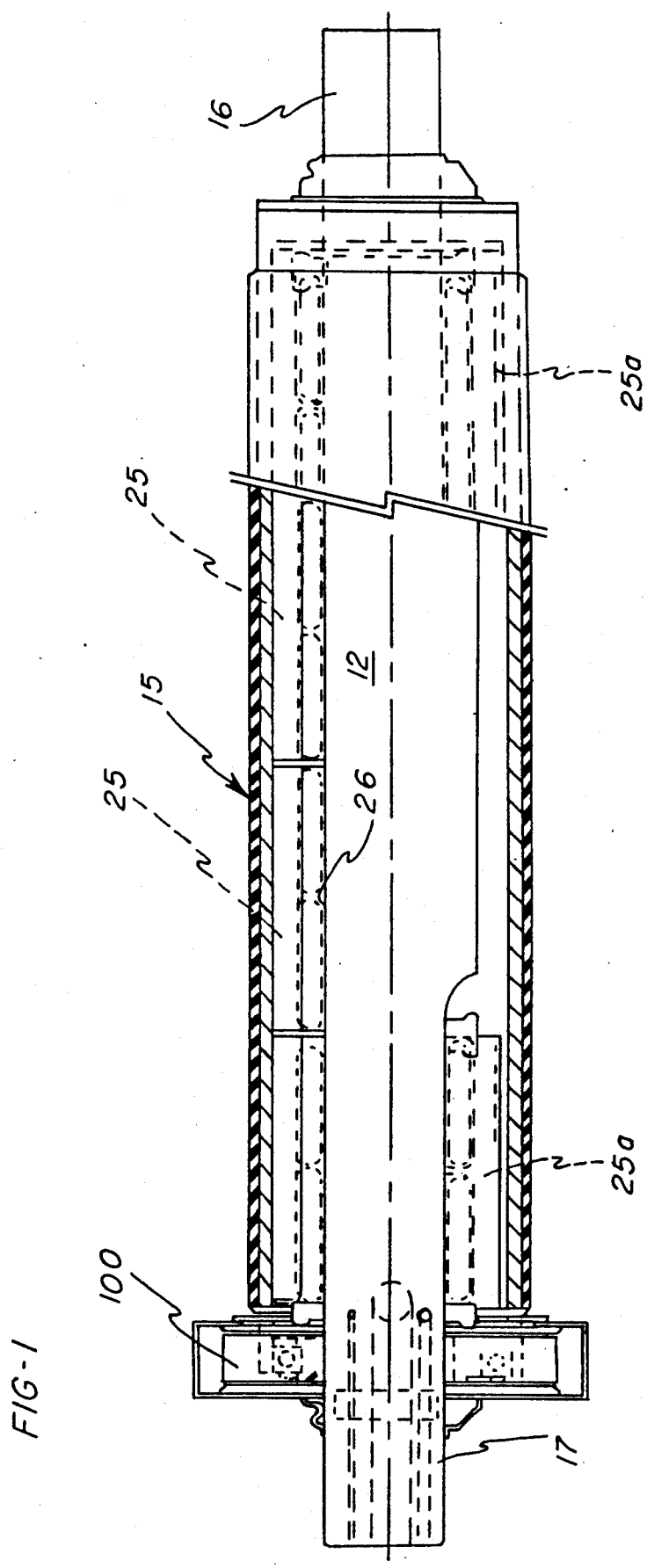
FIG. 1 is a side elevational view, partially in section, of a zone controlled pressure compensated roll in accordance with this invention.
Figure 4:
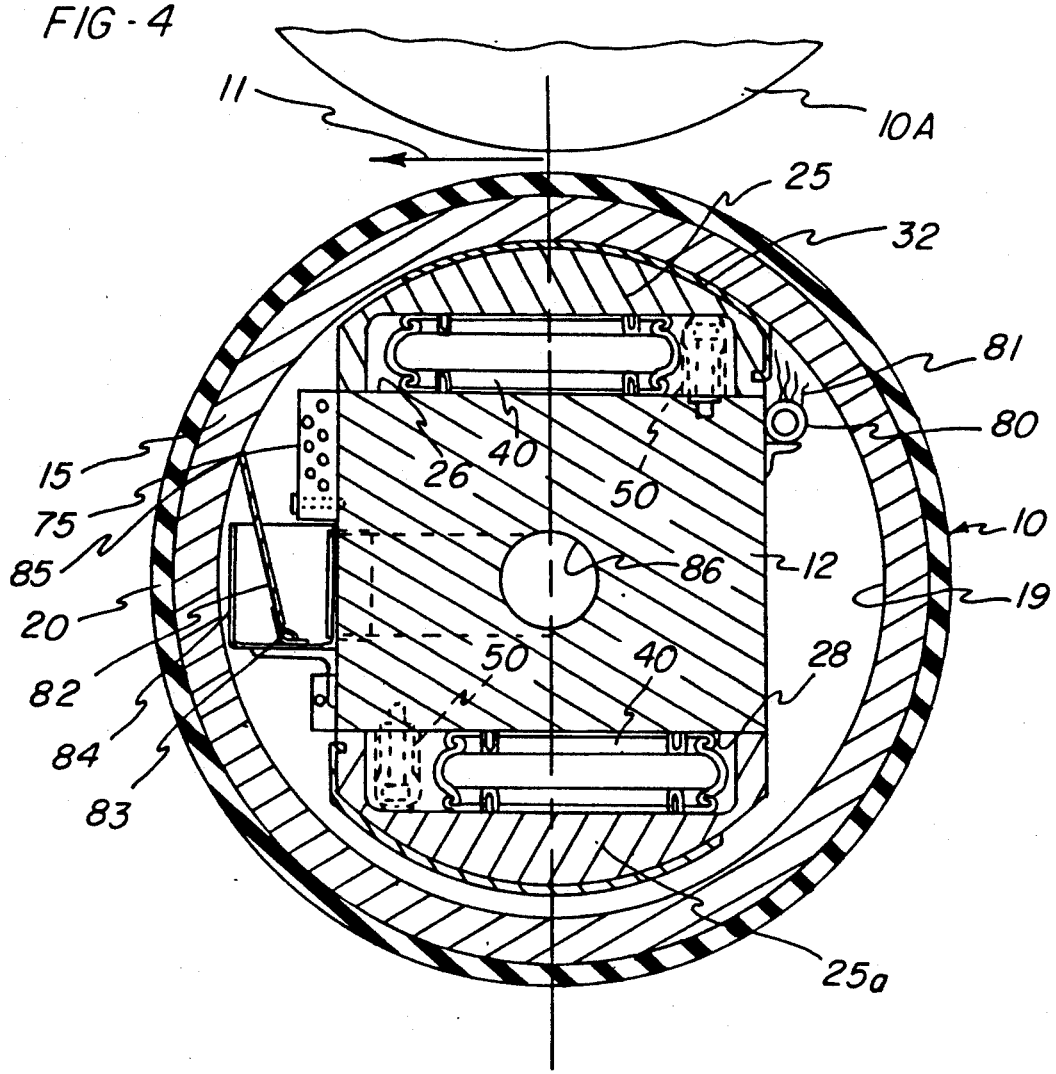
FIG. 4 is a transverse section through the roll looking generally along the line 4—4 of FIG. 3.

Referring to the figures of the drawing, which illustrate preferred embodiments of the invention, a zone compensated press roll according to this invention is illustrated generally at 10 in FIG. 1. It is understood that the roll 10 is designed to operate in a nip relation to a second roll 10a immediately above the roll 10, as shown in FIG. 4, thereby defining with such other roll a machine direction, as shown by the arrow 11. The arrow 11 represents the direction through which sheet-type material, such as paper, would move in a nip between the roll 10 and a superimposed roll 10a in the press section of a paper machine, for example.

Figure 12:
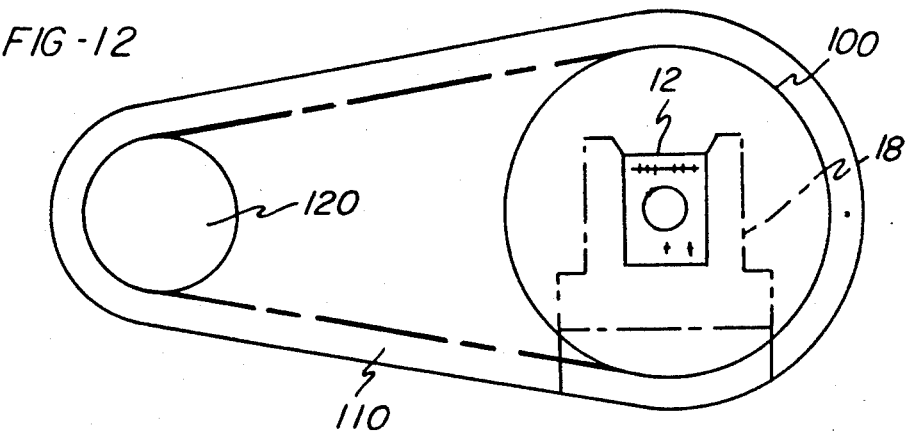
FIG. 12 is a side elevation of the power drive belt arrangement.

The major components of the zone compensated roll 10 include a central stationary support beam 12, and an outer rotatable sleeve or shell 15 which is received over the beam 12 and which rotates about the beam 12. The beam 12 has opposite ends 16 and 17 which are mounted or supported on a machine frame 18 (FIG. 12). The beam 12 is rectangular in transverse section, as shown in the sectional view of FIG. 4, and is designed with sufficient strength so that the total maximum deflection of the beam 12 is controlled within prescribed limits. The beam 12 may be forged from steel and suitably annealed.

The sleeve 15 may be formed of nodular cast iron or steel, and provided with a polished or smooth inside surface 19. It may also, optionally, be provided with a rubber outside covering 20. The sleeve 15 is supported for rotation on the beam 10 by a pair of guide bearings 21 at the opposite ends of the sleeve 15. The guide bearings 21 have an inner non-rotating race mounted on a support 22 and an outer race received within the end of the sleeve 15. The inner support 22 is formed with a rectangular central opening and is mounted directly on the beam 12, adjacent one of the ends 16 or 17. The bearings 21 need only to carry a small lateral load as appropriate for a narrow single ring ball bearing of the kind illustrated.

The roll of this invention is self loading, and therefore no external loading arms are required. Shell supporting means include a plurality of individual pressure shoes 25. The shoes 25 are positioned between a planar or support the mounting surface 26 of the beam 12 and the opposed inside surface 19 of the sleeve 15. The shoes 25 each occupy a limited extent in a direction transversely of the beam, and are positioned along the beam surface 26 in side-by-side relation.

The roll 10 may provided with a greater or fewer number of the sleeve supporting pressure shoes 25 in accordance with a desired increment of control of sleeve bending. In the example given in the drawings, a roll 15 is provided with a nominal working face of 170 inches in width in which the individual shoes are 28 inches wide. Six shoes, as described, are employed, although this is by way of example only, and fewer or greater number of the shoes may be employed.

In addition to the primary pressure shoes 25, along the upper beam surface 26, a pair of unloading shoes 25a, which may be identical in construction to the shoes 25, are provided at the opposite ends of the beam 12 and the sleeve 15, on bottom land surfaces 28 formed on the beam for the purpose of accommodating the unloading shoes 25a. The unloading shoes provide a positive arrangement by which the roll 10 may be unloaded by moving the sleeve 15 away from a nip, as desired for servicing or for threading the machine. The unloaded position is illustrated in FIG. 4.

Figure 5:
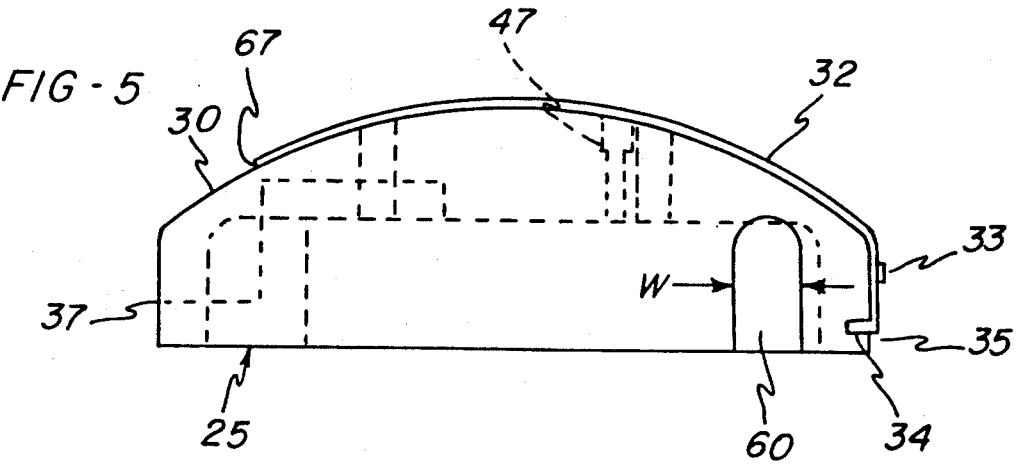
FIG. 5 is a side elevation of one of the pressure shoes.

The design and construction of the shoes may be more readily appreciated by reference to FIGS. 5–7. Each of the shoes 25 is formed with an upper sleeve-conforming semi-cylindrical surface 30. A thin sheet or bearing plate 32 is removably attached to the semi-cylindrical upper shoe surface 30 by fastener screws 33. A lower edge of the plate 32 is received within a transverse notch 34 formed in the leading edge 35 of the shoe. The bearing plate arches over the upper surface of the shoe and terminates in slightly spaced relation to the trailing edge 37, for reasons which are described below.

The plate 32, which defines a curved outer bearing surface for the shoe, is preferably formed of a sheet bearing type material, such as bronze. A suitable shoe bearing surface may alternatively be formed integrally with the upper surface of the shoe, although the bronze bearing sheet 32 provides the advantage of ease of maintenance, by replacement in the event of wear.

The radius of curvature defined by the shoe surface 30 is designed so as to substantially conform to the curvature of the highly finished inside surface 19 of the sleeve 15. The radius of curvature may be slightly but not appreciably less than that of the inside surface.

Figure 11:
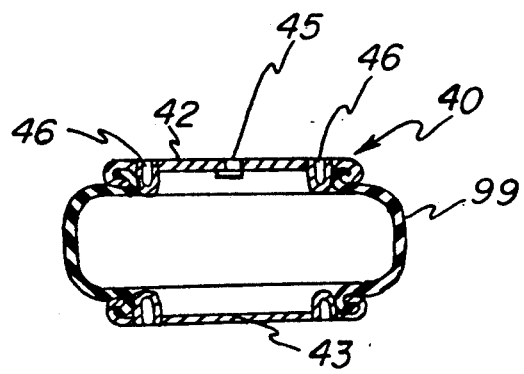
FIG. 11 is a sectional view through one of the air actuators used in the practice of this invention.

Each shoe 25 is formed with a pair of side by side internal cylindrical recesses 38 (FIG. 7). The recesses 38 open at the bottoms of the shoes are positioned laterally or transversely of the shoe between the leading edge 35 and trailing edge 37. The recesses are proportioned to receive a pair of inflatable bellows 40, as shown in FIGS. 4 and 11. The actuators 40 are air lifts or air springs, as are commercially available from a number of sources, including The Goodyear Tire & Rubber Company, Greensburg, Ohio 44232, and The Firestone Industrial Products Company, Carmel, Ind., 46032. The actuator as illustrated in FIG. 11 is the Firestone type 19-75.

Preferably, an air spring should be chosen which has elastomer or flexible wall components which are resistant to deterioration by reason of any fluids or lubricating oils with which they may come into contact. As shown in FIG. 11, the air spring or air actuator 40 is formed with a flat upper mounting plate 42 and a flat lower mounting plate 43 joined by an annular donut-shape enclosing flexible bellows 44. One of the plates, such as the upper plate 42, is provided with an air inlet fitting or opening 45.

The lower or bottom plates 43 of the air actuators 40 rest directly on the planar or flat upper surface 26 of the beam 12, and while the remainder of the actuator is received within one of the cylindrical recesses 38 formed in the shoe 25, as shown in FIG. 4. The upper plate 42 is also formed with blind fastener recesses 46. The shoe has aligned recess and shouldered screw openings 47 through which fastener screws (not shown) are inserted for securing the upper plate 42 to the shoe.

The individual shoes 25 are mounted on the beam 12 by mounting means which provides translational movement of the shoes in at least three degrees of freedom. One such movement is in a direction radially of the sleeve or sleeve 15. This direction may be considered as a "Z" axis, and is orthogonally related to an "X" axis which is defined as parallel to the machine direction 11, and a "Y" axis which is defined as parallel to the beam 12. The three degrees of freedom of movement for each of the shoes assure that the curved plate 32 conforms fully to the adjacent inside curved surface 19 of the sleeve or sleeve, even though a non-parallel relation may exist between the beam and sleeve due to beam and/or sleeve deflection. These three movements include at least radial movement along the "Z" axis, as previously defined, and rotational movements about each of the "X" and "Y" axes.

Figure 9:
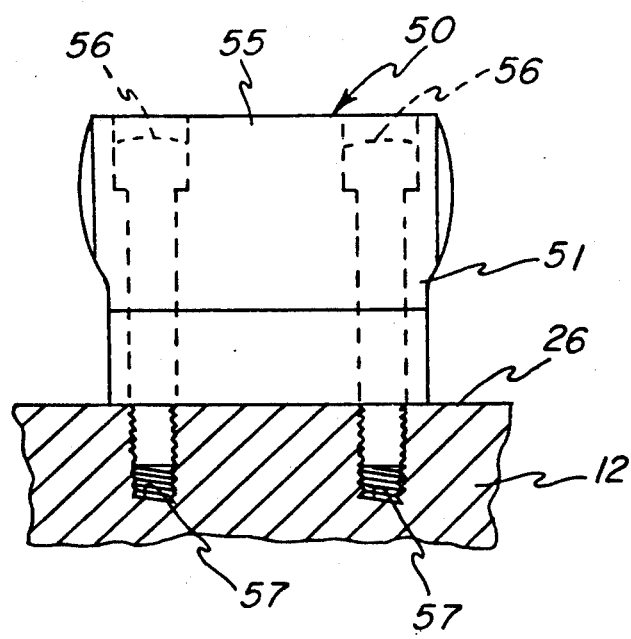
FIG. 9 is a front elevation of the stud of FIG. 8.

Such mounting means includes a plurality of individual mounting studs or pins 50 as illustrated in FIGS. 8 and 9. The pin 50 is mounted to the upper planar face or surface 26 of the beam 12, and is formed with a transversely elongated shank portion 51 which extends normally from a base 52 on the surface 26, i.e., in the "Z" direction and terminates in enlarged transversely oriented, semi-cylindrical head 55. In the end view of FIG. 8 it will be seen that the head 55 has a diameter which is greater than the thickness of the shank portion 51 and defines a pivot surface for the shoe. Each pin 50 is fixedly mounted to the beam 12 by means of a pair of machine screws 56 which extend through suitable openings formed in the head 55 and through the shank portion 51, into blind threaded openings 57 in the bearing.

The pin 50 is formed of a transverse width sufficient so as to capture and engage an adjacent pair of the shoes 25. For this purpose, each of the shoes, at the forward or leading edge 35, is formed with a slot 60. The slot 60 is formed at the forward lateral shoe corners and opens outwardly of the shoe at planar side surfaces 63, and is open at the shoe bottom surface 64, as shown in FIG. 5. The width "W" of the slot 60 in the machine direction "X", is proportioned to form a relatively close fit with the head 55 of the pin 50. Also, the depth of the slot 60, in the cross machine direction Y is sufficient comfortably to receive about one-half the width of a pin.

The pins 50 are positioned along the length of the beam so that two of the two adjacent shoes are supported on a common pin, in the slots 60. Since the shoe is formed with two of the slots 60, one at each lateral side, it is supported in such a manner that the entire shoe is free to move along the Z axis and also is free to rotate about the X and Y axes by a tilting movement. In this manner, the shoe is provided with three degrees of freedom of movement, thereby assuring an alignment between the outer surface of the bearing plate 32 and the inside cylindrical surface of the sleeve 20 under all operating conditions.

Figure 14:
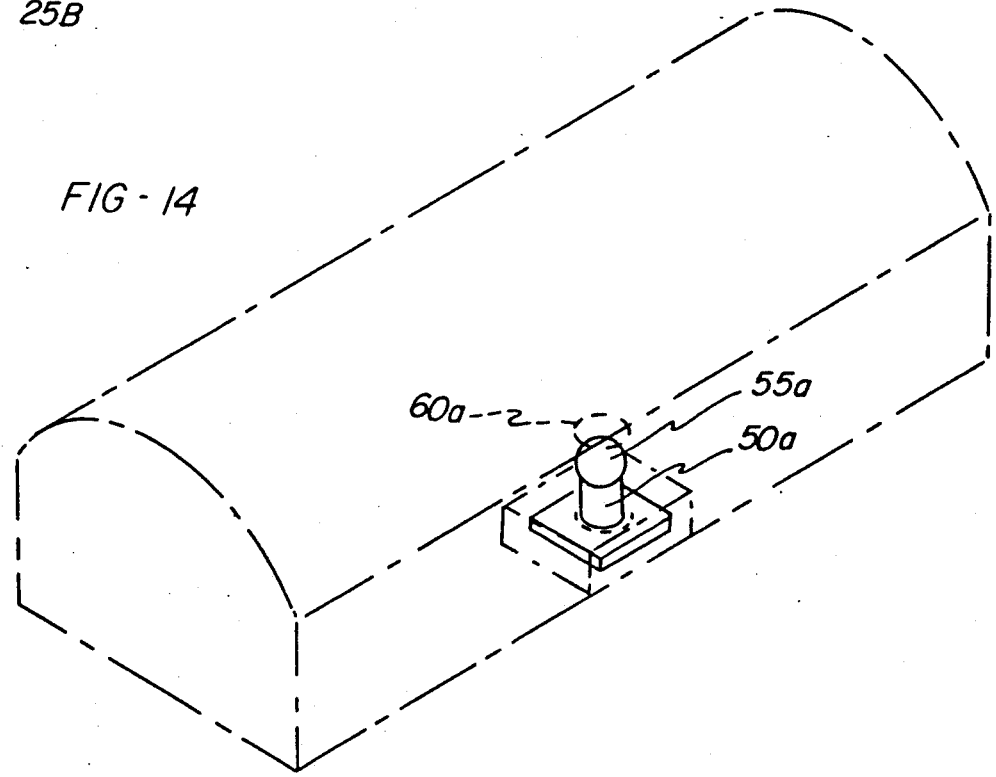
FIG. 14 illustrates a modified shoe support arrangement for four degrees of freedom of movement.

An alternative support arrangement (FIG. 14) shows a single pin 50a for each shoe located on the beam at the "Y" direction center of the shoe. The pin 50a has a head 55a with a full or partial ball surface and fits into a round "Z" direction hole 60a in the shoe and positioned inwardly of the leading edge. This support allows an additional degree of freedom of movement and correspondingly even better alignment of the shoes with the shell, in response to a balance of forces acting on the shoe. Yet the shoe is restricted from movement in the "X" and "Y" directions. The additional degree of freedom is rotatability of the shoe around the "Z" axis.

It will also be seen, by reference particularly to FIG. 7, that the recesses 38 for the air actuators 40 associated with each of the shoes are transversely aligned substantially on a center line equally spaced between the leading edge 33 and the trailing edge 37. Thus, the force which is applied by the actuators may be considered as located on the center of each of the shoes, providing a force in the radial or Z direction. However it is desirable that the pressure applied by the actuators to the inside surface of the sleeve be distributed in such a manner that portions of the shoes closer to the trailing edge heal 37 are subjected to a higher pressure than at the leading edge, to facilitate the admission hydrodynamically of a lubricating fluid between the bearing plate 32 and the sleeve surface 19. For this purpose, the bearing plate 32 may be terminated at 67, in somewhat spaced relation to the trailing edge 37 so as to achieve a higher loading pressure at the trailing edge than at the leading edge.

Each of the shoes further is provided with a pair of inlet passageways or openings 70 leading from the trailing edge 37 to the air inlet 45 for the air actuator 40. Flexible tubes, not shown, extend through the passageways and connect the air inlets 45 to a manifold block 75 (FIG. 4). The block 75 is mounted on a side of the beam and provides the means by which individual air lines are connected to an external pneumatic controller (not shown). The beam end 17 (FIG. 10) is tapped at 76 to form a means by which the individual bellows air lines from the manifold may be carried through the bearing 21, and exit the roll 10 for external connections to air controllers.

Figure 3:
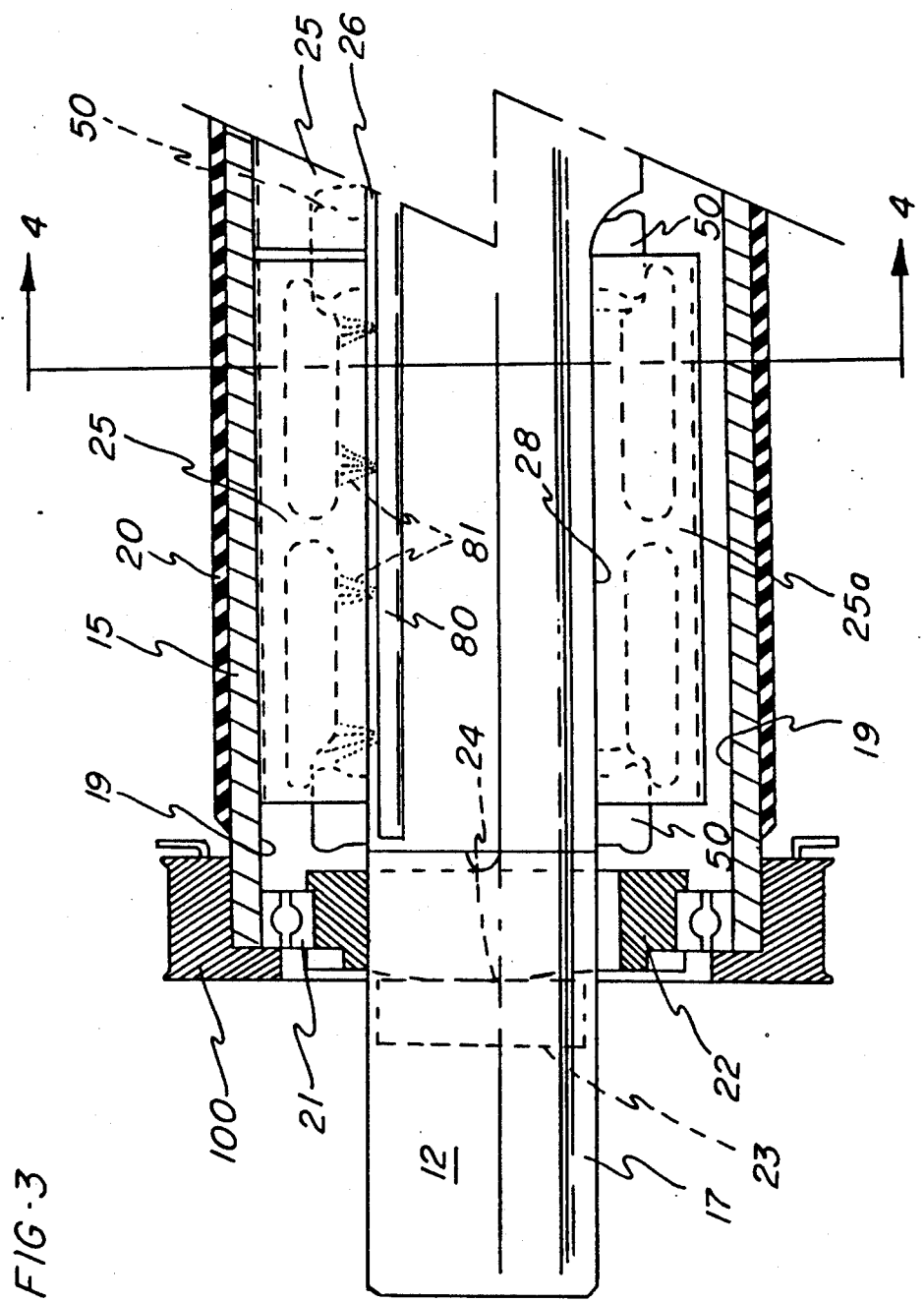
FIG. 3 is an enlarged fragmentary section view through the roll of FIG. 1.

The apparatus of this invention further includes means for applying a lubricating film to the inner surface 19 of the sleeve 20 immediately ahead of the leading edges of each of the shoes. For this purpose, as shown in FIG. 3, an oil delivery tube 80 extends longitudinally of the beam 12 and directs a spray 81 of oil onto the inside surface 19 of the sleeve. This oil is directed immediately before the shoe leading edge 35, to be entrained with sleeve rotation over the curved outer surface of the shoe, defined by the plate 32 thereby forming a hydrodynamic oil firm between the sleeve and the shoe.

Figure 10:
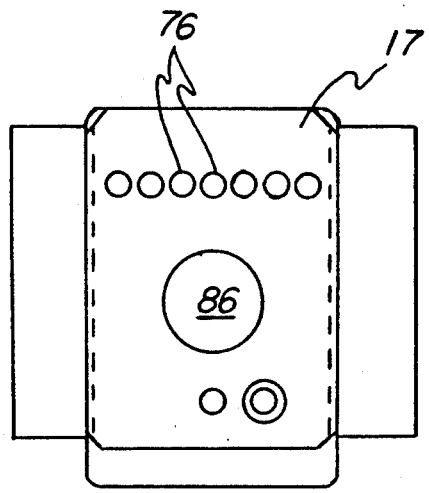
FIG. 10 is an end view of the support beam.

To prevent accumulation of excess oil from within the interior of the sleeve, a doctor blade or wiper 82 extends transversely of the sleeve and is pivotally mounted at 83 in a collection cup 84, A blade remote end 85 is positioned to scrape excess oil from the sleeve inside surface 19. Oil collected by the cup 84 is carried transversely of the beam and is withdrawn through a central oil return opening 86 to the end of the beam, as illustrated in FIG. 10.

The invention uses a simple stationary beam and a nip-loading arrangement which may employ commercially available air inflatable pressure devices. When six shoes are used, as illustrated, each supported by two air lifts, the roll may be divided into five separate loading zones as follows: 1-1-2-1-1. Such an arrangement, in which the two center shoes are controlled from a single air supply while the shoes on either side are independently controlled by independent air supplies, allows variable nip loading at the edges, at quarter points, and at the center. Alternatively, the air lifts may be individually controlled. It will be understood that the air lifts may be inflated with air under pressure, up to 150 psi or more, and controlled from an external air controller to provide the desired loading. If desired, the volume of air in the air lifts may be reduced or replaced by introducing a fluid, such as ethylene glycol, into the air lifts.

Nip loading is accomplished by suitably inflating the air lifts for each of shoes 25. Nip unloading is accomplished by suitably inflating the air lifts associated with the unloading shoes 25a, as illustrated in FIG. 1.

The arrangement of this invention provides a relatively large loading surface since the shoes are positioned in end-to-end relationship and extend substantially the length of the sleeve. Therefore, the unit loading pressures are reduced as compared to prior arrangements in which hydrodynamic pistons or cylinders have small surfaces which run against an inside surface of the sleeve. Conventional lubrication by oil film is more than adequate in most dynamic running conditions, and throughout the expected temperature range, for example in the press section of a papermaking machine. Although applications may be side pres, calender, smoothing press, pull rolls and the like.

The running temperature of the oil which is recirculated gravitationally and repumped under pressure to the spray tube 80, provides an inherent internal cooling system. The oil temperature will not normally be expected to exceed 150°–180° F. Further, bearing calculations have shown, for a maximum loading of 900 pli, that the bearing pressures will not exceed about 75 psi, well within permissible pressure limits for plain cylindrical journal bearings. Given a nominal rpm 286, calculations have provided a ZNP (centipoise×rpm/psi) of less than 100, and a film thickness of about 0.0024 inch, thereby assuring a long life for the bearing plates 32.

Figure 13:
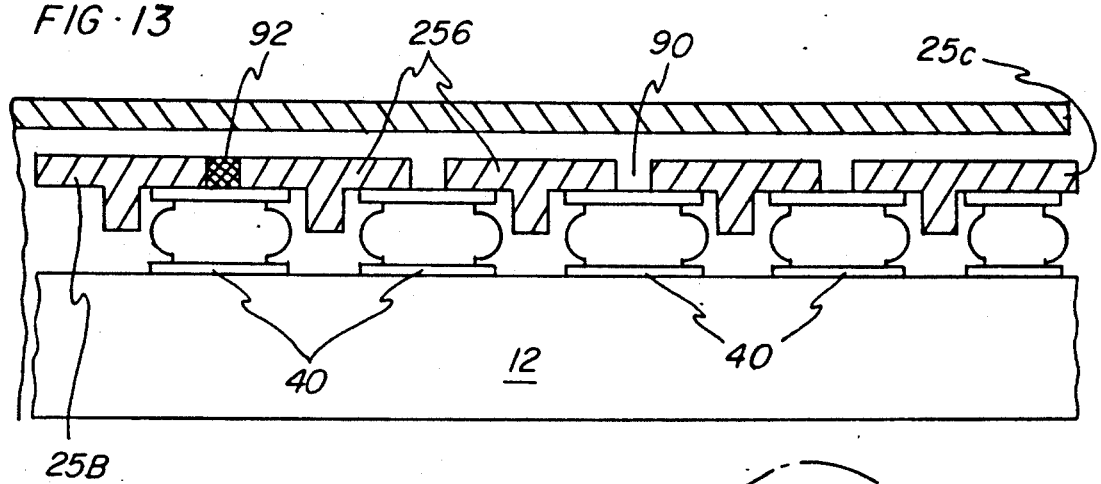
FIG. 13 is a fragmentary sectional view of a modified shoe and actuator arrangement.

FIG. 13 illustrates, diagrammatically, an alternative embodiment. The inflatable actuators 40 are positioned so that neighboring shoes 25b share a bellows. In this arrangement, except for an end shoe 25c, each shoe will have one bellows 40 which it shares with an adjacent shoe since the bellows are positioned in the lateral space between adjacent shoes 25b. Also, the gap or space 90 between adjacent shoes may be filled by a flexible bonding material 92. Such an arrangement has the advantage of providing an uninterrupted film of lubricant throughout the transverse width of the shoes within the shell in the "Y" direction. However, bonding or filling the gaps 90 with material 92 would not permit rotatability of the shoes about the "Z" axis. Accordingly, it would be preferred to mount the shoes on the pins 50 in the manner illustrated in connection with the shoes 25 of FIGS. 5–7.

The invention also includes a unique drive for the sleeve 15. This drive includes a cog belt type of pulley or sheave mounted directly on the sleeve, driven by a cog-type timing belt. The combination is unique in that the belt itself and associated belt pulleys can be located entirely within a side frame. The frame is self-compensating and is unaffected by either deflections of the sleeve or the beam.

A drive sheave or sprocket 100 is mounted in concentric relation to the beam and is secured directly to one end of the sleeve 15. Preferably, the drive sprocket 100 is formed with sequential projections and indentations or recesses of a particular profile for use with commercially available elastomeric drive belts such as the "Poly Chain" brand of drive belts of The Gates Rubber Company, Denver, Colo. 80217. The particular belt and pulley configuration is not critical for the purpose of this invention, and reference may be had to "Timing" Belt Engineering Handbook, Richard Y. Case, McGraw Hill Book Company, Inc., New York, 1954, and to the patents of Gregg, U.S. Pat. No. 3,969,946 and Gregg et al, U.S. Pat. No. 4,108,001 for a further understanding of the characteristics of suitable drive belt and sprocket configurations. The compact drive arrangement permits the belt 110 and the pulley 120 to be mounted between the side frames of a papermaking machine.

As shown in FIG. 12, the belt itself, represented at 110, is trained over the sprocket 100 and over a smaller drive pulley 120. The drive belt 110 is on an axis line 130 which is positioned generally at right angles to the direction of sleeve loading. In this manner, the nip loading by the sleeve, as accomplished by the shoes as previously described, is not influenced by belt tension, and sleeve movement under loading and unloading does not significantly change the running length of the belt between the shive or sprocket 100 and drive pulley 120.

Figure 2:
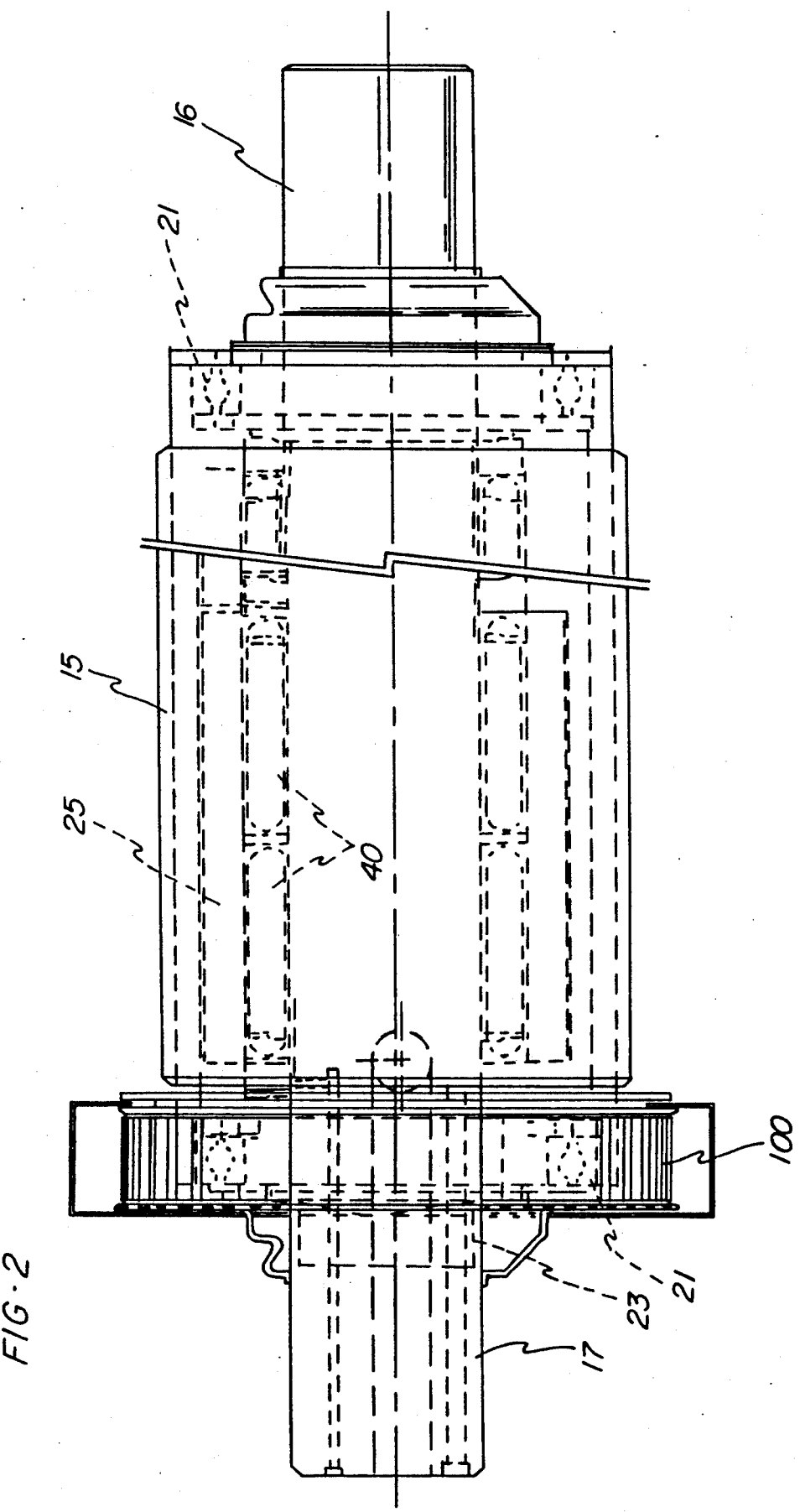
FIG. 2 is a portion of FIG. 1.

Further, it is important to note that the drive sprocket 100 is mounted directly over and concentric to the sleeve support bearing 21. In FIG. 2 the belt tension and loading are carried directly by the bearing. Belt tension does not affect sleeve deflection as the tension is transmitted directly to the support beam 12 through the bearing. The drive arrangement eliminates the need for complicated mechanical drives, and is compact and of relatively low cost compared to comparable direct drive arrangements for deflection controlled rolls.

The operation of the invention is largely self-evident from the foregoing description. The individual air actuators 40 are supplied with air under controlled pressure, as required, to load the nip and to control sleeve deflection. Generally, the roll will be brought up to a suitable minimum speed before being loaded by the shoes, to assure the maintenance of a lubricating film between the bearing plates 32 and the inside surface of the sleeve. Unloading is accomplished by releasing the air pressure from within the air lift actuators for the shoes 25 and applying pressure to the actuators for the unloading shoes 25a.

During operation a constant recirculated supply of oil is introduced, by the spray pipe 75, and is collected by the wiper or doctor blade 82 through the oil return opening 86. This oil provides constant film lubrication over the entire range of pressures available, and also provides cooling for the bearing surfaces.

While the forms of apparatus herein described constitutes preferred embodiments of this invention, it is to be understood that the invention is not limited to these precise forms of apparatus, and that changes may be made therein without departing from the scope of the invention which is defined in the appended claims.

What is claimed is:

1. A deflection controlled self-loading roll in which a rotatable roll shell is supported on a non-rotating central beam by a plurality of individual movable shoes positioned along said beam transversely of the roll between said beam and said shell, and is movable by said shoes between an unloaded position for servicing or threading a web thereon and a loaded position, and in which said shoes have surface means thereon for bearing against an inside surface of said shell in sliding relation thereto for compensating for shell bending under nip loading against a second roll, and in which said shoe surface means and said inside shell surface are separated, during use, by a lubricating film, the improvement comprising:

a plurality of inflatable bellows type actuators comprising upper and lower rigid plates, which form mounting surfaces, separated by a collapsible enclosing wall;

means mounting said actuators along said beam such that said bellows are adopted to apply to said shoes a generally radial force along a "Z" axis upon the application of fluid pressure thereto to urge said shoes into engagement with said shell inside surface;

means mounting said shoes on said beam providing for translational movement of said shoes along said "Z" axis while providing for rotational movement of said shoes at least about orthogonal "X" and "Y" axes, in which the "X" axis is generally parallel to the direction of movement of material through said nip, and the "Y" axis is generally parallel to said beam, and in which said lubricating film between said shoes and said shell inside surface is generated exclusively by hydrodynamic plain bearing action therebetween.

2. The deflection controlled roll of claim 1 in which said shoes are limited to movements consisting of said rotational movement about said "X" and "Y" axes and said transitional movement along said "Z" axis.

3. The deflection controlled roll of claim 1 further comprising bearing means on said shoes defining said shoe surface means and conforming with an adjacent inside surface of said shell, said shoe having an inner surface adjacent said beam, and in which said actuators are positioned between said beam and said shoe inner surfaces.

4. The deflection controlled roll of claim 3 in which each of said shoes has means defining a actuator-receiving recess in said shoe inner surface, and each said actuator is proportioned to be received at least partially in one of said shoe recesses.

5. The roll of claim 4 in which there is a pair of said actuators for each of said shoes positioned in lateral side-by-side relation.

6. The roll of claim 3 in which each of said shoes has a leading edge and a trailing edge defined with respect to the direction of rotation of said shell relative to said shoes, and said shoe mounting means includes a plurality of laterally spaced pins for each of said shoes, said pins having one end fixedly mounted to said beam and having a remote end, and a pair of laterally spaced slot means in each of said shoes adjacent said leading edges thereof received over a pair of said pin remote ends.

7. The roll of claim 6 in which the resultant force applied by said actuators to a said shoe is offset in said "X" axis direction toward said shoe trailing edge.

8. The roll of claim 3 in which said shoe bearing means comprises a layer of bearing-type material forming a plain bearing with said shell inside surface.

9. The roll of claim 3 in which each of said shoes has a leading edge and a trailing edge defined with respect to the direction of rotation of said shell relative to said shoes, and in which said shoe mounting means comprises, for each shoe, a single pin, each said pin having a lower end secured to said beam and having an enlarged upper end, and means in said shoe adjacent said leading edge defining a recess receiving said pin enlarged upper end therein whereby said shoe may rotate on said pin about said "Z" axis.

10. In a zone compensated deflection controlled self-loading press roll in which a rotatable roll shell is supported and carried on a non-rotating central load carrying beam and is movable on said beam between an unloaded position for servicing or threading a web thereon and a loaded position, the improvement comprising:

a plurality of transversely positioned side-by-side shoes carried on said beam, said shoes each having a leading edge and a trailing edge in relation to the rotation of said shell about said beam, each of said shoes having an outer shell conforming surface for coaction with an adjacent inner surface of said shell for supporting said shell in relation to said beam, said shell conforming surface extending on its associated said shoe substantially from said leading edge to said trailing edge, means mounting each of said shoes adjacent said leading edge thereof to said beam and providing for at least three degrees of movement of said shoes in relation to said beam, a plurality of bellows-type actuators comprising upper and lower rigid plates, which form mounting surfaces, separated by a collapsible enclosing wall, said actuators being positioned between said beam and said shoes rearwardly of said shoe leading edges for applying a generally radially directed force urging said shoes into engagement with said shell inner surface, and means introducing a lubricant so that said lubricant is carried between said shoe shell conforming surfaces and said shell inner surface at said shoe leading edges upon rotation of said shell and forming a hydrodynamic film of lubricant between said shell-conforming surfaces and said shell inner surface.

11. The roll of claim 10 in which said actuators comprise air lift bellows.

12. The actuator of claim 10 in which said shell conforming surfaces are formed with a layer of bearing material, and in which said lubricant is oil.

13. The roll of claim 10 in which said shoes are positioned in end-to-end relation with respect to said shell, and defining axial gaps therebetween, and means defining flexible connections in said gaps between adjacent said shoes thereby providing a substantially continuous surface relative to said shell inner surface so that said lubricating film is substantially uninterrupted between adjacent said shoes.

14. The roll of claim 10 further comprising a pair of said actuators for each of said shoes.

15. The roll of claim 10 in which single said actuators are positioned between each pair of adjacent said shoes.

16. The roll of claim 10 further comprising a pair of shell supporting bearings, one at each axial end of said shell supporting said shell for rotation on said beam, and drive means for said roll including a cog belt sheave mounted on said shell at one axial end thereof in substantial surrounding relation to one of said bearings, a cog-type drive belt threaded on said sheave, and a drive pulley for said drive belt positioned such that deflections of said shell by said shoes do not effect a change in tension in said drive belt.

* * * * *